United States Patent
Walzer, Jr. et al.

(10) Patent No.: US 6,262,202 B1
(45) Date of Patent: Jul. 17, 2001

(54) NONCOORDINATING ANIONS FOR OLEFIN POLYMERIZATION

(75) Inventors: John F. Walzer, Jr., Seabrook; Donna J. Crowther, Baytown, both of TX (US); Bernard J. Folie, Rhode-Saint-Genese (BE)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/261,627

(22) Filed: Mar. 3, 1999

Related U.S. Application Data

(60) Provisional application No. 60/076,712, filed on Mar. 4, 1998, provisional application No. 60/076,841, filed on Mar. 4, 1998, provisional application No. 60/087,445, filed on Jun. 1, 1998, provisional application No. 60/087,446, filed on Jun. 1, 1998, and provisional application No. 60/087,447, filed on Jun. 1, 1998.

(51) Int. Cl.$^7$ .................................................. C08F 4/52
(52) U.S. Cl. .............. 526/133; 526/134; 526/160; 526/161; 526/943; 526/348.6; 526/347; 502/152; 502/203
(58) Field of Search ............................. 526/133, 134, 526/160, 170, 348.6; 502/103, 153, 117

(56) References Cited

U.S. PATENT DOCUMENTS

| | | | |
|---|---|---|---|
| 5,198,401 | * 3/1993 | Turner et al. | 502/155 |
| 5,278,119 | 1/1994 | Turner et al. | 502/155 |
| 5,296,433 | 3/1994 | Siedle et al. | 502/117 |
| 5,801,113 | * 9/1998 | Jejelowo et al. | 502/104 |

FOREIGN PATENT DOCUMENTS

| | | |
|---|---|---|
| 2017190 | 11/1990 | (CA) . |
| 2133181 | 3/1995 | (CA) . |
| 0 284 708 A1 | 9/1987 | (EP) . |
| 0 284 708 B1 | 9/1987 | (EP) . |
| 0 316 155 A2 | 11/1988 | (EP) . |
| 0 399 348 A2 | 5/1990 | (EP) . |
| 0 407 870 A2 | 7/1990 | (EP) . |
| 0 516 018 A2 | 5/1992 | (EP) . |
| 0 612 769 A1 | 2/1994 | (EP) . |
| 0 645 401 A1 | 9/1994 | (EP) . |
| 0 666 267 A2 | 12/1994 | (EP) . |
| 0 824 113 A1 | 2/1997 | (EP) . |
| 10-60034 | 3/1998 | (JP) . |
| WO 92/15596 | 9/1972 | (WO) . |
| WO 96/28480 | 9/1996 | (WO) . |
| WO 97/19959 | 6/1997 | (WO) . |
| WO 97/29845 | 8/1997 | (WO) . |
| WO 97/48735 | 12/1997 | (WO) . |
| WO 98/27119 | 6/1998 | (WO) . |
| WO 99/06412 | 2/1999 | (WO) . |
| WO 99/43685 | 9/1999 | (WO) . |

OTHER PUBLICATIONS

Silolene–Bridged Zirconocenium Polymerization Catalysts, Woei–min Tsai and James C. W. Chien, Dept. of Polymer Science and Engineering, Materials Research Laboratories, University of Massachusetts, 1993, pp. 149–158.

Stereoselective Synthesis of a Germanium–Bridged Zirconocene for Temperature–Invariant Propylene Polymerizations, You–Xian Chen, Marvin D. Rausch, and James C. W. Chien, Organometallics 1994, 13, 748–749.

New ansa–Metallocenes of the Group 4 Transition Metals as Homogeneous Catalysts for the Polymerization of Propene and Styrene, Malcolm L.H. Green and Nobuhide Ishihara, Inorganic Chemistry Laboratory, J. Chem. Soc. Dalton Trans. 1994, pp. 657–665.

"$\eta_5$–$C_5Me_5TiMe_3B(C_6F_5)_3$: A Carbocationic Olefin Polymerization Initiator Masquerading As A Ziegler–Natta Catalyst," J. Am. Chem. Soc., vol. 116, pp. 6435–6436, (1994).

(1,3–Propanediyl) silylene–bis(1–indenyl) dichlorozirconium. Synthesis and polymerization catalysis, You–Xain chen, Marvin D. Rausch, James C. W. Chien, Journal of Organometallic Chemistry 487, 1995, 29–34.

Synthesis and characterization of ansa–[1,1–bis(inden–1, 1–diyl)–1–silacyclopentane]zirconium dichlorides. Crystal structures of meso–and racemic–[1,1–bis inden–1,1–diyl) –1–silacycopentane] dichloro zirconium and racemic–[1,1–bis(4,5,6,7–tetrahydroinden–1,1–diyl)–1–sila–cylopentane] dichlorozirconium, Hendrik J.G. Luttikhedde, Reko P. Leino, Jan H. Nä sman, Markku Ahlgr˝n, Tapani Pakkanen, Journal of Organometallic Chemistry 486, 1995, 193–198.

Preparation and X–ray structure of a novel chiral methylene bridged titanocene complex Christopher A. Willoughby, William M. Davis, Stephen L. Buchwald, Journal of Organometallic Chemistry 497, 1995, 11–15.

\* cited by examiner

*Primary Examiner*—David W. Wu
*Assistant Examiner*—R. Harlan

(57) ABSTRACT

Bulky noncoordinating anions that are surprisingly stable under olefin polymerization conditions such that olefin polymers can be prepared with unexpectedly high molecular weights at high catalyst efficiencies. Thus the invention is directed to an olefin polymerization process comprising contacting under polymerization conditions one or more ethylenically unsaturated monomers with a catalyst composition comprising at least one organometallic transition metal compound activated to a cationic state and a stabilizing, compatible non-coordinating Group 13 anionic complex having halogenated aromatic ligands in an essentially tetrahedral structure wherein the aromatic groups are polycyclic fused or pendant aromatic rings.

11 Claims, No Drawings

NONCOORDINATING ANIONS FOR OLEFIN POLYMERIZATION

The application is based on U.S. provisional applications Nos. 60/076,712 filed on Mar. 4, 1998, 60/076,841 filed on Mar. 4, 1998 and 60/087,445, 60/087,446, 60/087,447 each filed on Jun. 1, 1998.

TECHNICAL FIELD

This invention relates to the use of noncoordinating anions suitable for stabilization of cationic olefin polymerization catalyst compounds.

BACKGROUND OF THE INVENTION

The term "noncoordinating anion" is now accepted terminology in the field of olefin polymerization, both by coordination or insertion polymerization and carbocationic polymerization. See U.S. Pat. Nos. 5,198,401 and 5,278,119 for early work, and Baird, Michael C., et al, $\eta^5$-$C_5Me_5TiMe_3B(C_6F_5)_3$: A Carbocationic Olefin Polymerization Initiator Masquerading as a Ziegler-Natta Catalyst, *J. Am. Chem. Soc.* 1994, 116, 6435–6436. The noncoordinating anions are described to function as electronic stabilizing cocatalysts, or counterions, for cationic transition metal complexes which are active for olefin polymerization as illustrated in the above references among many others. The terms as used here and in the references applies both to truly noncoordinating anions and weakly coordinating anions that are not so strongly coordinated to the cationic complex so as to be labile to replacement by olefinically or acetylenically unsaturated monomers at the insertion site.

U.S. Pat. No. 5,198,401 describes a preferred noncoordinating anion tetra(pentaflourophenyl) boron, $[B(pfp)_4]^-$ or $[B(C_6F_5)_4]^-$, wherein the perfluorinated phenyl ligands on the boron makes the counterion labile and stable to potential adverse reactions with the metal cation complexes. Other aryl radicals are said to be suitable in addition to the phenyl radicals, napthyl and anthracenyl are listed. U.S. Pat. No. 5,296,433 teaches the utility of borane complexes comprising tris(pentafluorophenyl)borane and specific complexing compounds. These complexes are said to allow higher molecular weight polymers when used with metallocenes for olefin polymerizaton due to increased solubility of the complexes in monomer or monomer solutions. WO 97/29845 describes the preparation of the organo-Lewis acid perfluorobiphenylborane, and its use to prepare and stabilize active, olefin polymerization catalysts. These cocatalysts are described as being less coordinating than tris (perfluorophenyl)boron, $B(C_6F_5)_3$, and thus capable of providing higher catalytic activities. Generic description of the suitable cocatalysts according to the application include those of the formula BR'R" where B is boron with R' and R" representing at least one and maybe more fluorinated biphenyls or other polycyclic groups, such as napthyl, anthryl or fluorenyl.

INVENTION DISCLOSURE

Bulky noncoordinating anions that are surprisingly stable under olefin polymerization conditions such that olefin polymers can be prepared with unexpectedly high molecular weights at essentially equal or greater catalyst efficiencies as prior art cocatalysts are disclosed. Thus the invention is directed to an olefin polymerization process comprising contacting under polymerization conditions one or more ethylenically unsaturated monomers with a catalyst composition comprising at least one organometallic transition metal compound activated to a cationic state and a stabilizing, compatible non-coordinating Group 13 anionic complex having halogenated aromatic ligands in an essentially tetrahedral structure wherein the aromatic groups are polycyclic fused or pendant aromatic rings.

BEST MODE AND EXAMPLES OF THE INVENTION

The invention activating cocatalyst, precursor ionic compounds comprise anionic Group 13 element complexes having at least three halogenated, aryl-substituted aromatic ligands. These invention aromatic ligands consist of polycyclic aromatic hydrocarbons and aromatic ring assemblies in which two or more rings (or fused ring systems) are joined directly to one another or together. These ligands, which may be the same or different, are covalently bonded directly to the metal/metalloid center. In a preferred embodiment the aryl groups of said halogenated tetraaryl Group 13 element anionic complex comprise at least one fused polycyclic aromatic hydrocarbon or pendant aromatic ring. Indenyl, napthyl, anthracyl, heptalenyl and biphenyl ligands are exemplary. The number of fused aromatic rings is unimportant so long as the ring junctions and especially the atom chosen as the point of connection to the Group 13 element center permit an essentially tetrahedral structure. Thus, for example, suitable ligands include those illustrated below. See the polycyclic compound examples in the literature for ligand selection, e.g., *Nomenclature of Organic Compounds*, Chs. 4–5 (ACS, 1974).

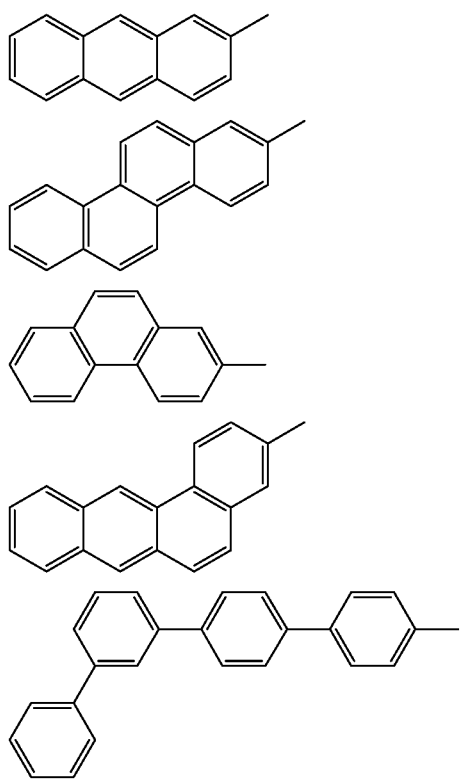

I

-continued

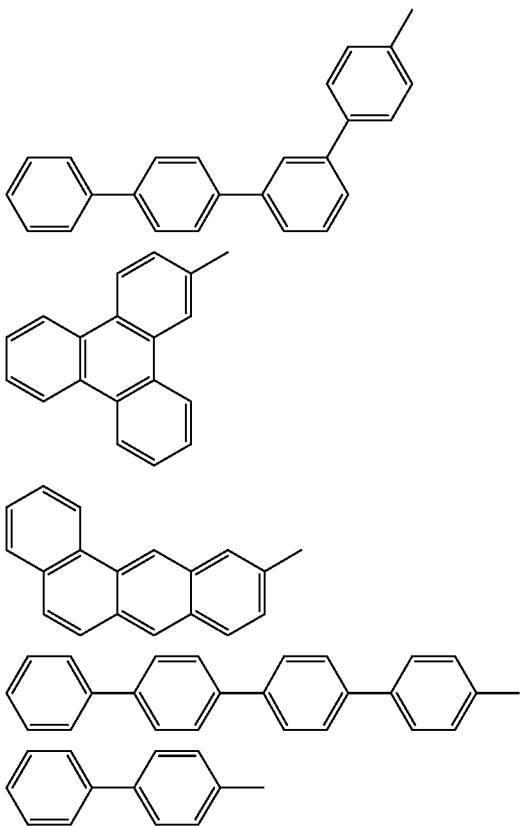

The choice of ligand connection point is particularly important. Substituents or ring junctions ortho to the ligand connection point present such steric bulk that adoption of an essentially tetrahedral geometry is largely precluded, and typically should be avoided, that is essentially absent except in mixed ligand systems. Examples of undesirable connection points, such as ortho substitutents or fused rings, are depicted below.

II

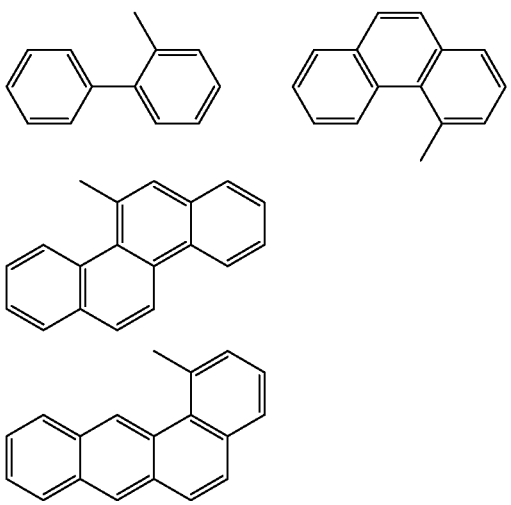

Suitable mixed-ligand Group 13 complexes can include fused rings or ring assemblies with ortho-substituents, or ring junctions, so long as those ligands do not exceed two in number. Thus Group 13 anions with one or two hindered fused ring aromatics with three or two unhindered ligands, where hindered aromatics are those having ortho-substituents or ring junctions (illustration II, above) and unhindered are those without (illustration I, above), will typically be suitable. Tris(perfluorophenyl)(perfluoroanthracyl) borate is an illustrative complex. In this complex the anthracyl ligand is a hindered fused ring having ortho-substituents but its use with three unhindered phenyl ligands allows the complex to adopt a tetrahedral structure. Thus, generically speaking, the Group 13 complexes useful in a accordance with the invention will typically conform to the following formula:

$$[M(A)_{4-n}(B)_n]^+$$

where, M is a Group 13 element, A is an unhindered ligand as described above, B is a hindered ligand as described above, and n=1,2.

For both fused aromatic rings and aromatic ring assemblies, halogenation is highly preferred so as to allow for increased charge dispersion that contributes along with steric bulk as independent features decreasing the likelihood of ligand abstraction by the strongly Lewis acidic metallocene cation formed in the catalyst activation. Additionally, halogenation inhibits reaction of the transition metal cation with any remaining carbon-hydrogen bonds of the aromatic rings, and perhalogenation precludes such potential undesirable reactions. Thus it is preferred that at least one third of hydrogen atoms on carbon atoms of the aryl-substituted aromatic ligands be replaced by halogen atoms, and more preferred that the aryl ligands be perhalogenated. Fluorine is the most preferred halogen.

The noncoordinating anions of the invention are suitable for use with any of the ionic catalyst systems known in the art or those in development, where such make use of noncoordinating anions. Catalytically suitable transition metal compounds capable of cationization include the Group 3-10 transition metal compounds known to be capable of olefin polymerization when activated to a stable cationic state. Both homogenous and heterogenous processes, the later of which typically use catalysts supported on polymeric or metal oxide particulate supports are suitable. These include gas phase, solution, slurry and bulk polymerization processes for any homopolymers of ethylenically unsaturated monomers, or copolymers of two or more such monomers, selected from the group consisting of ethylene, propylene, $C_4$–$C_{20}$ α-olefins, $C_5$–$C_{20}$ strained ring cyclic olefins (e.g., norbornene, alkyl-substituted norbornene), vinyl aromatic monomers (e.g., styrene and alkyl-substituted styrenes), macromers of up to 1000 or more mer units derived from said monomers. Such processes typically operate in a temperature range of –50° C. to 250° C. and at pressure of 0 to 3000 bar.

Examples of transition metal compounds capable of insertion polymerization of ethylenically unsaturated olefins when activated to a cationic state are typically stable, discrete ionic catalyst systems. Group 4-6 metallocenes are exemplary. The term metallocene as used herein includes those compounds containing a single cyclopentadienyl ligand or a substituted derivative thereof ("mono (cyclopentadienyl) metallocenes"), and those containing two cyclopentadienyl ligands or substituted and unsubstituted derivatives thereof ("bis(cyclopentadienyl) metallocenes"). Either class may be unbridged or may be bridged, e.g., between the single cyclopentadienyl ligand and a heteroatom ligand on the same transition metal center, or between the two cyclopentadienyl ligands on the same transition metal center. Precursor compounds for and the catalyst systems themselves are well-known in the art. Description of metallocene compounds appear in the patent literature, for example U.S. Pat. Nos. 4,871,705, 4,937,299, 5,324,800, EP-A- 0 418 044, EP-A-0 591 756, WO-A-92/00333 and WO-A-94/01471. The metallocene compounds described are those described as mono- or bis-substituted Group 4, 5, and 6 transition metal compounds wherein the cyclopentadienyl substituents may be themselves substituted with one or more groups and may be bridged to each other, or may be bridged through a heteroatom to the transition metal. Preferably for higher molecular weight polymer components the biscyclopentadienyl (or substituted biscyclopentadienyl, such as indenyl, substituted indenyl, fluorenyl, substituted fluorenyl, azulenyl or substituted azulenyl, etc.) rings, will be bridged and will be lower alkyl-substituted ($C_1$–$C_6$) in the 2 position and will additionally comprise alkyl, cycloalkyl, aryl, alkylaryl and or arylalkyl substituents, the latter as either of fused or pendant ring structures including multi-ring structures, for example, those of U.S. Pat. Nos. 5,278,264 and 5,304,614. Such substituents should each have essentially hydrocarbyl characteristics and will typically contain up to 30 carbon atoms but may be hetero-atom containing with not more than 1–3 non-hydrogen/carbon atoms, e.g., N, S, O, P, Si or Ge.

Metallocene compounds suitable for the preparation of linear polyethylene or ethylene-containing copolymers (where copolymer means comprising at least two different monomers) are essentially any of those known in the art, see WO-A-92/00333, WO 97/44370 and U.S. Pat. Nos. 5,001,205, 5,057,475, 5,198,401, 5,304,614, 5,308,816 and 5,324,800 for specific listings. Selection of metallocene compounds for use to make isotactic or syndiotactic polypropylene blends, and their syntheses, are well-known in the art, specific reference may be made to both patent literature and academic, see for example Journal of Organmetallic Chemistry 369, 359–370 (1989). Typically those catalysts are stereorigid asymmetric, chiral or bridged chiral metallocenes. See, for example, U.S. Pat. Nos. 4,892,851, 5,017,714, 5,132,381, 5,296,434, 5,278,264, WO-A-(PCT/US92/10066) WO-A-93/19103, EP 0 577 581, EP 0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein.

Preferably the monocyclopentadienyl metallocene catalyst components are those additionally comprising a Group 15 or 16 heteroatom covalently bound both to the Group 4 transition metal center and, through a bridging group, to a ring carbon of the cyclopentadienyl group-containing ligand. Such catalysts are well-known in the art, see, e.g., background U.S. Pat. Nos. 5,055,438, 5,096,867, 5,264,505, 5,408,017, 5,504,169 and WO 92/00333. See also, U.S. Pat. Nos. 5,374,696, 5,470,993 and 5,494,874; and, see, international publications WO 93/19104 and EP 0 514 828 A. For cyclic olefin-containing copolymers, see WO-94/17113, U.S. Pat. No. 5,635,573, and WO 96/002444. Additionally, the unbridged monocyclopentadienyl, heteroatom-containing Group 4 transition metal catalyst components of WO 97/22639, will be suitable in accordance with the invention. Transition metal polymerization catalyst systems from Group 5-10 metals wherein the active transition metal center is in a high oxidation state and stabilized by low coordination number polyanionic ancillary ligand systems are described in U.S. Pat. No. 5,504,049. Each of the foregoing references are incorporated by reference for the purposes of U.S. patent practice.

Catalytically suitable non-cyclopentadienyl, Group 4 or 5 precursor compounds that are capable of being activated to stable, discrete cationic complexes include those containing bulky chelating diamide ancillary ligands, such as described in U.S. Pat. No. 5,318,935 and "Conformationally Rigid Diamide Complexes: Synthesis and Structure of Tantalum (III) Alkyne Derivatives", D. H. McConville, et al, *Organometallics* 1995, 14, 3154–3156. Other suitable group 4 and 5 non-metallocene catalyst compounds are bimetallocyclic catalyst compounds comprising two independently selected Group 4 or Group 5 metal atoms directly linked through two covalent bridging groups so as to form cyclic compounds having delocalized π-bonding, see WO96/40805. See also the Group 5 metal compounds of copending U.S. application Ser. No. 08/798,412, filed Feb. 7, 1997. Each of the foregoing references are incorporated by reference for the purposes of U.S. patent practice.

Suitable Group 10 metal compounds are those wherein the metal is in a +2 oxidation state. Typical $Ni^{2+}$ and $Pd^{2+}$ complexes are diimine complexes that can be prepared by methods equivalent to those used for the compounds described in "New Pd(II)- and Ni(II)-Based Catalysts for Polymerization of Ethylene and α-Olefins", M. Brookhart, et al, *J. Am. Chem. Soc.*, 1995, 117, 6414–6415, WO 96/23010 and WO 97/02298. See also, WO 97/48735. See additionally the related bis(imino) Group 8 and 9 organometallic compounds described by V. C. Gibson and others in "Novel olefin polymerization catalysts based on iron and cobalt", *Chem. Commun.*, 849–850, 1998. Each of the foregoing references are incorporated by reference for the purposes of U.S. patent practice.

Carbocationic polymerization can be effected by use of the catalysts of the invention when converted to active cationic species by activating ionization. Such polymerization techniques are well known in the art, see Kennedy, J. P., *Carbocationic Polymerization of Olefins: A Critical Inventory* (John Wiley & Sons, 1975). See also, Baird, Michael C., et al, $\eta^5$-$C_5Me_5TiMe_3B(C_6F_5)_3$: A Carbocationic Olefin Polymerization Initiator Masquerading as a Ziegler-Natta Catalyst, *J. Am. Chem. Soc.* 1994, 116, 6435–6436, for conditions under which the first row metal Ti in stable metallocene cationic form was used for carbocationic polymerization of styrene. Each is incorporated by reference for purposes of U.S. patent practice.

Means of preparing ionic catalyst systems comprising catalytically active cations of the transition metal compounds and suitable noncoordinating anions are conventionally known, see for example U.S. Pat. No. 5,198,401 and WO 92/00333. Typically the methods comprise obtaining from commercial sources or synthesizing the selected transition metal compounds comprising an abstractable ligand, e.g., hydride, alkyl or silyl group, and contacting them with a noncoordinating anion source or precursor compound in a suitable solvent. The anion source abstracts the univalent hydride, alkyl or silyl ligand that complements the total valency requirements if the transition metal compounds. The abstraction leaves the transition metal compounds in a +1 cationic state, which is counterbalanced by the stable, compatible and bulky, noncoordinating anion The noncoordinating anions may be introduced into the catalyst preparation step as either ionic compounds having a cation which abstracts by protonation or oxidation a non-cyclopentadienyl ligand of the transition metal compounds or as neutral compounds which upon direct abstraction of the non-cyclopentadienyl ligand, each leaving as a by-product the noncoordinating anionic complex. Additionally, it is known that the use of alkylating compounds along with an anion source enables the use of transition metal compounds having ligands too strongly bound to the transition metal center to be abstracted by the anion source, e.g., transition metal dihalides. Typical alkylating sources may be any of the strongly Lewis acidic organoaluminum compounds such as the lower carbon number alkyl aluminums and alkylalumoxanes. See EP 0 500 944, EP 0 570 982 and EP 0 612 768 for in situ processes describing the reaction of alkyl aluminum compounds with dihalo-substituted metallocene compounds prior to or with the addition of activating anion precursor compounds. Each of the above documents is incorporated by reference for purposes of U.S. patent practice. Most preferably transition metal compounds not having halide ligands on the metal center are used for the ionic catalyst systems of this invention since in situ alkylation processes may result in competing reactions and interactions that tend to interfere with the overall polymerization efficiency under conditions of high temperature in accordance with the preferred process embodiment of the invention.

Suitable cations for salts of the noncoordinating anions of the invention cocatalysts include those known in the art. Such include the nitrogen-containing cations such as those in the anilinium and ammonium salts of U.S. Pat. No. 5,198,401 and WO 97/35893, the carbenium, oxonium or sulfonium cations of U.S. Pat. No. 5,387,568, metal cations, e.g., $Ag^+$, the silylium cations of WO 96/08519, and those of the hydrated salts of Group 1 or 2 metal cations of WO 97/22635. The teachings of these references are incorporated by reference for the purposes of U.S. patent practice. Additionally, the noncoordinating anions of the invention can be provided by neutral Lewis acids comprising a Group 13 metal or metalloid center and from one to three halogenated aryl ligands as described above for the invention, complementary ligands being selected from those known in the art for noncoordinating anions.

The catalyst complexes of the invention are useful in polymerization of unsaturated monomers conventionally known to be polymerizable under coordination polymerization conditions using metallocenes. Such conditions are well known and include solution polymerization, slurry polymerization, gas-phase polymerization, and high pressure polymerization. The catalyst of the invention may be supported and as such will be particularly useful in the known operating modes employing fixed-bed, moving-bed, fluid-bed, slurry or solution processes conducted in single, series or parallel reactors.

When using the catalysts of the invention, particularly when immobilized on a support, the total catalyst system will generally additionally comprise one or more scavenging compounds. The term "scavenging compounds" as used in this application and its claims is meant to include those compounds effective for removing polar impurities from the reaction environment. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be used in the polymerization process itself. Where possible the use of alklyaluminum scavenging compounds is to be avoided altogether.

Typically the scavenging compound will be an organometallic compound such as the Group-13 organometallic compounds of U.S. Pat. Nos. 5,153,157, 5,241,025 and WO-A-91/09882, WO-A-94/03506, WO-A-93/14132, WO 95/07941 and of WO 97/22635. Exemplary compounds include triethyl aluminum, triethyl borane, triiusobutyl aluminum, methylalumoxane, isobutyl aluminumoxane, tri (n-octyl) aluminum and tri(n-octyl) aluminum. Those scavenging compounds having bulky or $C_6$–$C_2$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear, alkyl-substituted aluminum compounds, such as tri-n-hexylaluminum, tri-n-octylaluminum, or tri-n-dodecylaluminum. Alumoxanes also may be used in scavenging amounts, e.g., methylalumoxane and triisobutylaluminoxane. The amount of scavenging agent to be used with the catalyst compounds of the invention is minimized during polymerization reactions to that amount effective to enhance activity and avoided altogether if the feeds can be sufficiently free of adventitious impurities.

The catalyst according to the invention may be supported for use in gas phase, bulk, slurry polymerization processes, or otherwise as needed. Numerous methods of support are known in the art for copolymerization processes for olefins. Both inorganic oxide and polymeric supports may be utilized in accordance with the knowledge in the field. See, for example, international publication WO 91/09882, U.S. Pat. Nos. 5,427,991 and 5,643,847, copending applications U.S. Ser. Nos. 60/048,965, filed Jun. 3, 1997, 60/079,063 and 60/079,569, both filed Mar. 27, 1998. Each of the foregoing documents is incorporated by reference for purposes of U.S. patent practice.

In preferred embodiments of the process for this invention, the catalyst system is employed in liquid phase (solution, slurry, suspension, bulk phase or combinations thereof), in high pressure liquid or supercritical fluid phase, or in gas phase. Each of these processes may be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Halocarbon solvents, e.g., methylene chloride will additionally be suitable. Bulk and slurry processes are typically done by contacting the catalysts with a slurry of liquid monomer or with monomer in liquid alkane, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352,749, 5,436,304, 5,453,471, and 5,463,999, and WO 95/07942. Each is incorporated by reference for purposes of U.S. patent practice.

Generally speaking the polymerization reaction temperature can vary from about −50° C. to about 250° C. Preferably the reaction temperature conditions will be from −20° C. to 220°, more preferably below 200° C. The pressure can vary from about 1 mm Hg to 3000 bar, preferably from 0.1 bar to 2000 bar.

The processes using unsupported catalysts are preferably designed or conducted such that the cocatalyst components, that is the transition metal compounds and the anion precursor compounds, are maintained separately until just prior to or during polymerization use in the chosen reactor. An example is the use of dual injection of each catalyst component directly into the reactor or the use of T- or multi-joint mixing chambers just prior to injection into the reactor. Alternatively the catalyst may be formed in-situ by the independent addition of ionic activator, ligand stabilized metal halide, and scavenger directly into the reactor or the use of T- or multi-joint mixing chambers just prior to injection into the reactor. Additional optimization can be achieved when the scavenger compound is introduced into the reactor independently of the catalyst system, or compounds.

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect.

EXAMPLES

I. High Temperature Semi-Batch Polymerization

Example 1

Ethylene/1-octene copolymerizations were carried out in a well-stirred semi-batch reactor (0.5 L) equipped to perform coordination polymerization in the presence of an inert hydrocarbon (hexane) solvent at pressures up to 350 psig and temperatures up to 150° C. In the vapor-liquid (VL) polymerization system, the polymerization occurs in the liquid phase whereas ethylene was continuously fed to the reactor to keep the vapor phase overhead pressure constant at 265 psig during the polymerization. In those experiments, the reactor temperature was kept constant at 140° C. by throttling the amount of steam added to the reactor mantle and by adjusting the amount of catalyst fed to the reactor by the pump. Typically, 250 ml of dried n-hexane, 18 ml or 36 ml of dried 1-octene, and 200 μl of tri-n-octyl aluminum (TOA), a poisons scavenger, were fed to the reactor which was then brought to 140° C. The reactor content was then pressurized to 265 psig by feeding ethylene and maintained at constant ethylene pressure throughout the polymerization. The polymerization was started by continuously feeding a pre-activated toluene solution of the catalyst during 30 minutes. The catalyst flow rate was stopped, the reactor depressurized, and allowed to cool to room temperature. The product was precipitated out of solution was then dried in an oven at 100° C. for 8 hr. All values reported are average values from 2 or more runs under the same conditions.

| Symbols for Tables 1 and 2 below | |
|---|---|
| Catalyst ("MCN") | Metallocene Compound |
| A | diphenylmethylene(cyclopentadienyl) (fluorenyl) hafnium dimethyl |
| B | dimethylsilyl bis(indenyl) hafnium dimethyl |

-continued

| Symbols for Tables 1 and 2 below | |
|---|---|
| C | phenylmethylene bis(fluorenyl) hafnium dimethyl |
| Co-catalyst ("CC") | Group 13 Compound |
| I | [N,N-dimethylanilinium] [tetrakis(heptafluoronapthyl) boron] |
| II | [N,N-dimethylanilinium] [tetrakis((perfluoro-4-biphenyl) borate |
| III (Comparison) | [N,N-dimethylanilinium] [tetrakis(perfluorophenyl) boron] |
| IV (Comparison) | tris(perfluorophenyl) borane |

TABLE 1

| EX I MCN/CC | Yield (g) | MCN (mg) | CE (g/g) | Wt % $C_8$ (H-NMR) | $M_W$ GPC-DRI | $M_n$ GPC-DRI | PDI GPC-DRI |
|---|---|---|---|---|---|---|---|
| 1) A/I | 8 | 13 | 615 | 28.4 | 154,188 | 68,343 | 2.25 |
| 2) A/II | 22.1 | 20 | 1107 | 24.6 | 155,658 | 61,280 | 2.58 |
| 3) A/III (c) | 5.1 | 13 | 392 | 29.2 | 155,658 | 53,747 | 2.15 |
| 4) B/II | 23 | 4.8 | 4802 | 21.2 | 90,934 | 38,741 | 2.34 |
| 5) B/III (c) | 11.9 | 17.6 | 676 | 25 | 64,163 | 31,365 | 2.06 |
| 6) C/I | 7.5 | 20 | nm | 36.3 | 80,605 | 38,172 | 2.11 |
| 7) C/III (c) | 6.6 | 15.0 | nm | 42.2 | 57,933 | 31,822 | 1.83 | notes : nm means "not measured".

II. Continuous High Temperature Solution Process

The following polymerization reactions were performed in a stirred, liquid filled 2 L jacketed steel reactor equipped to perform continuous insertion polymerization in presence of an inert $C_6$ hydrocarbon (naphta) solvent at pressures up to 120 bar and temperatures up to 240° C. The reactor was typically stirred at 1000 rpm during the polymerization. The reaction system was supplied with a thermocouple and a pressure transducer to monitor changes in temperature and pressure continuously, and with means to supply continuously purified ethylene, 1-octene, and solvent. In this system, ethylene dissolved in the hydrocarbon solvent, 1-octene, tri-n-octyl aluminum (TOA) used as a scavenger, and optionally $H_2$, are pumped separately, mixed, and fed to the reactor as a single stream, refrigerated to −40° C. using liquid $NH_3$ as a coolant. The transition metal component (TMC) was dissolved in a solvent/toluene mixture (9/1 vol/vol) whereas the non-coordinating anion (NCA) activator was dissolved in toluene or slurried in the hydrocarbon solvent. Both components were pumped separately, mixed at ambient temperature, and cooled to −1° C. prior to entering the reactor. The reactor temperature was set by adjusting the temperature of an oil bath used as a reservoir for the oil flowing through the reactor wall jacket. Next, the polymer molecular weight (MW) or MI was controlled independently by adjusting the ethylene conversion (% $C_2$) in the reactor via the catalyst flow rate. Finally, the polymer density was controlled by adjusting the ethylene/1-octene weight ratio in the feed.

TABLE 2

| Ex II # | MCN | CC | Temp (° C.) | % C2 Conv. | kg PE/ g -MCN | density g/ml | MIR $I_{21.6}/I_2$ | PDI $M_w/M_n$ | MI dg/min |
|---|---|---|---|---|---|---|---|---|---|
| 1 | B | I | 151 | 86.4% | 675 | 0.899 | 46.8 | 2.3 | 0.49 |
| 2 | B | II | 150 | 87.3% | 552 | 0.899 | 43.0 | 2.3 | 0.85 |
| 3 (c) | B | III | 150 | 85.0% | 450 | 0.903 | 33.0 | nm | 3.0 |
| 4 (c) | B | IV | 150 | 85.0% | 300 | 0.900 | nm | nm | 3.0 |
| 6 | A | I | 171 | 84.8% | 281 | 0.899 | 53.3 | 2.4 | 0.29 |
| 7 | A | II | 172 | 85.5% | 245 | 0.897 | 34.1 | 2.4 | 2.0 |
| 8 (c) | A | III | 171 | 86.9% | 135 | 0.901 | 31.0 | 2.2 | 3.6 | note : C - comparison; nm - not measured

The results of the eight polymerization experiments performed in the reactor described above with two different transition metal compounds (A and B), and four ionizing activators are summarized in Table 2. For example, the polymerization reaction in example II run #1 was carried out at 151.2° C. and 57.2 bar with compound B activated by dimethyl anilinium tetrakis(heptafluoro-naphthyl)borate. The 1-octene/ethylene weight ratio in the feed was 0.36 wt/wt in this case. Both catalyst components were continuously fed to the reactor, resulting in an ethylene conversion of 86.4% and a 1-octene conversion of 60.1%. For a reactor residence time of 8 minutes, the polymer yield was 1.4 g kg/hr. under these conditions. By adding TOA at a rate of 0.08 mmol/hr. to the feed, the catalyst efficiency (CE) lined out around 348 kg PE/g A. This experiment resulted in an ethylene/1-octene copolymer containing 18.8 weight % comonomer (by FTIR) and having the characteristics reported in Table 2.

This data summarized in Tables 1 and 2 indicate that the A, B and C hafnocene compounds activated by cocatalysts I and II exhibit superior molecular weight and activity capability for the polymerization of ethylene and 1-octene in high-temperature solution processes than if they are activated by the conventional pentafluorophenyl-based activators III and IV. For example, at 170° C. and 85% ethylene conversion, the MI drops from 1.6 to 0.2 dg/min at comparable density (0.900 g/cc) whereas the catalyst activity increases from 150 to 350 kg PE/g when I is used to activate the A catalyst in place of III.

Similarly, catalyst B exhibits better molecular weight ($M_n$) and activity capability when activated by II than if it is activated by the pentafluorophenyl-based activators III–IV.

The following is claimed:

1. An olefin polymerization process comprising contacting under polymerization conditions one or more ethylenically unsaturated monomers with a catalyst composition comprising at least one organometallic transition metal compound activated to a cationic state and a stabilizing, compatible non-coordinating Group 13 anionic complex having halogenated aromatic ligands in an essentially tetrahedral structure wherein the aromatic groups are polycyclic fused or pendant aromatic rings.

2. The process according to claim 1 wherein said transition metal compound is a Group 4-6 metallocene.

3. The process according to claim 2 wherein said metallocene is a substituted or unsubstituted bis (cyclopentadienyl) zirconium metallocene.

4. The process according to claim 2 wherein said metallocene is a substituted or unsubstituted bis (cyclopentadienyl) hafnium metallocene.

5. The process according to claim 2 wherein said metallocene is a substituted or unsubstituted mono (cyclopentadienyl) titanium metallocene.

6. The process according to claim 2 wherein said metallocene is a substituted or unsubstituted mono (cyclopentadienyl) zirconium or hafnium metallocene.

7. The process according to claim 1 wherein said transition metal compound is a non-cyclopentadienyl Group 4-10 organometallic compound capable of being activated to a stable, discrete cationic complex.

8. The process according to claim 1 wherein said ethylenically unsaturated monomers are selected from the group consisting of ethylene, propylene, $C_4$–$C_{20}$ α-olefins, $C_5$–$C_{20}$ strained ring cyclic olefins, vinyl aromatic monomers, geminally disubstituted monomers, and macromers of up to 1000 or more mer units derived from said monomers.

9. The process according to claim 1 wherein said polymerization conditions are selected from one or more of those for solution, bulk, slurry, gas phase or supercritical pressure olefin polymerization processes.

10. The process according to claim 9 wherein said process is conducted at a temperature less than 140° C.

11. The process according to claim 6 wherein said polymerization conditions are selected from one or more of those for solution, bulk, slurry, gas phase or supercritical pressure olefin polymerization processes.

* * * * *